C. W. SMITH & C. M. LAMB.
RAKE.
APPLICATION FILED MAR. 14, 1917.
1,239,735.
Patented Sept. 11, 1917.
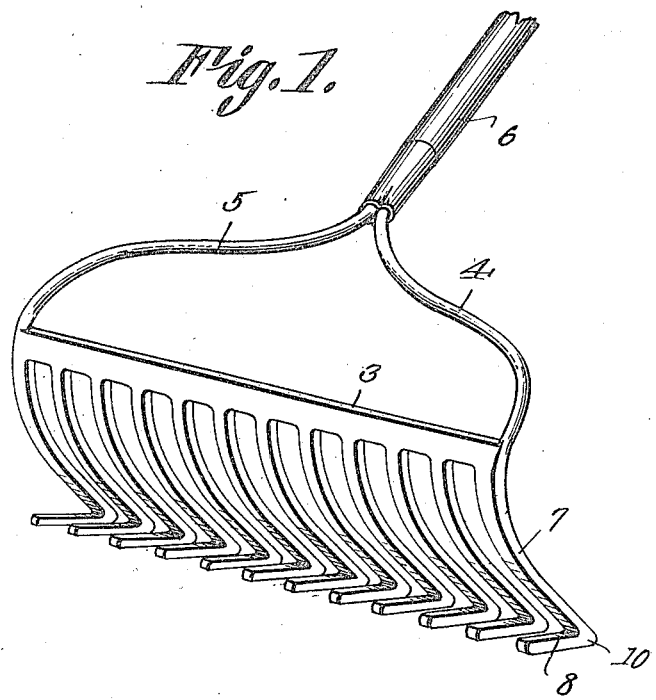
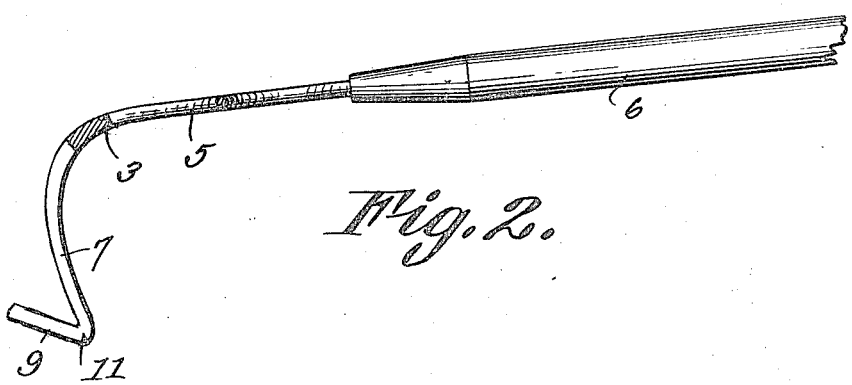

UNITED STATES PATENT OFFICE.

CHAUNCEY WARREN SMITH AND CLARENCE MERRITT LAMB, OF SAN BERNARDINO, CALIFORNIA.

RAKE.

1,239,735. Specification of Letters Patent. Patented Sept. 11, 1917.

Application filed March 14, 1917. Serial No. 154,772.

*To all whom it may concern:*

Be it known that we, CHAUNCEY WARREN SMITH and CLARENCE MERRITT LAMB, citizens of the United States of America, and residents of San Bernardino, in the county of San Bernardino and State of California, have invented certain new and useful Improvements in Rakes, of which the following is a specification.

This invention relates to harrows and diggers and particularly to rakes of the hand type.

An object of this invention is to produce a rake having teeth which will prove effective in reaching the soil around the grass roots so that deposits of leaves of grass or foreign substances may be removed without impairing the grass or other vegetation or the roots thereof; the said invention being effective to permit manipulation of the rake in a forward or backward movement without liability of the teeth thereof unduly penetrating the surface over which the rake is moved.

A further object of this invention is to provide a rake having teeth effective for purposes of raking while at the same time, the said teeth have added functions in that they are effective to disintegrate clods of earth when the said teeth are brought into contact with the said clods, and furthermore, the invention has for its object, the provision of a novel back which will prove effective as a drag for removing earth or deposits which cannot be operated upon by the teeth of the rake.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a view in perspective of a rake embodying the invention, and a handle; and Fig. 2 illustrates a sectional view thereof, the handle being in elevation.

In these drawings 3 denotes the head of the rake having a straight upper edge and the ends of said head have arms 4 and 5 respectively, the said arms converging and being attached to a handle 6 in any known or desired manner.

The teeth 7 are of uniform configuration and extend from the head 3 in curved formation for a portion of their lengths and then terminate in extensions 8 which stand at an angle to the teeth and present relatively straight surfaces 9 which, upon manipulation of the rake, may come in contact with the clods or lumps of earth to be disintegrated. In the use of the rake for the purpose last mentioned, the rake is lifted and brought into contact with the clods of earth and the impact of said rake is depended upon to break up the said lumps or clods.

At the angle 10 of the teeth and extensions, there is a rounded or slightly rounded surface 11, which rides over the surface of the ground being cultivated, and this obviates the penetration of the ground by the said teeth, and permits the rake to move forward or backward with equal facility.

By reason of the construction of the head and the arms associated with it, the head may be placed in close proximity to trees, buildings, or the like, for the purpose of removing any objects that may be stuck to the ground or for the removal of dirt which is against or near the side of the building or in a corner which is relatively inaccessible.

The rake has been found especially useful in cultivating young plants since the non-penetrating character of the teeth prevents injury while at the same time insuring proper agitation of the soil.

We claim—

In a rake, a head, a plurality of curved rake teeth carried by the head, said teeth being equally spaced throughout their length and having free equal spaces between them, and flat extensions projecting rearwardly at an angle from the ends of the curved teeth.

CHAUNCEY WARREN SMITH.
CLARENCE MERRITT LAMB.

Copies of this patent may be obtained for five cents each, by addressing the "Commissioner of Patents, Washington, D. C."